No. 739,633. PATENTED SEPT. 22, 1903.
G. S. AKERS.
SEAT SUPPORTING BICYCLE EXTENSION FRAME.
APPLICATION FILED JAN. 17, 1903.
NO MODEL.

Witnesses

Inventor
George S. Akers.
Edwin Guthrie
Attorney

THE NORRIS PETERS CO., PHOTO-LITHO., WASHINGTON, D. C.

No. 739,633. Patented September 22, 1903.

UNITED STATES PATENT OFFICE.

GEORGE SAMUEL AKERS, OF AMBIA, INDIANA.

SEAT-SUPPORTING BICYCLE EXTENSION-FRAME.

SPECIFICATION forming part of Letters Patent No. 739,633, dated September 22, 1903.

Application filed January 17, 1903. Serial No. 139,425. (No model.)

*To all whom it may concern:*

Be it known that I, GEORGE SAMUEL AKERS, a citizen of the United States, residing at Ambia, in the county of Benton and State of Indiana, have invented certain new and useful Improvements in Seat-Supporting Bicycle Extension-Frames; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to seat-supporting bicycle extension-frames, and belongs particularly to that class of devices comprising a framework for attachment to any form of bicycle, the attachment including as one of its parts a wheel which, taken with the two bicycle-wheels, forms practically a tricycle-structure capable of standing by itself and designed for carrying a load in addition to the operator.

The object of my invention is the production of an extension-frame of special construction supporting a suitable seat in a particular manner, the frame comprising the least practicable number of parts and points of connection with the bicycle-frame, thereby rendering its attachment or removal the work of very little time and labor and reducing the cost of manufacture of the invention.

I accomplish the object by means of the parts and their association illustrated in the accompanying drawings, of which—

Figure 1:
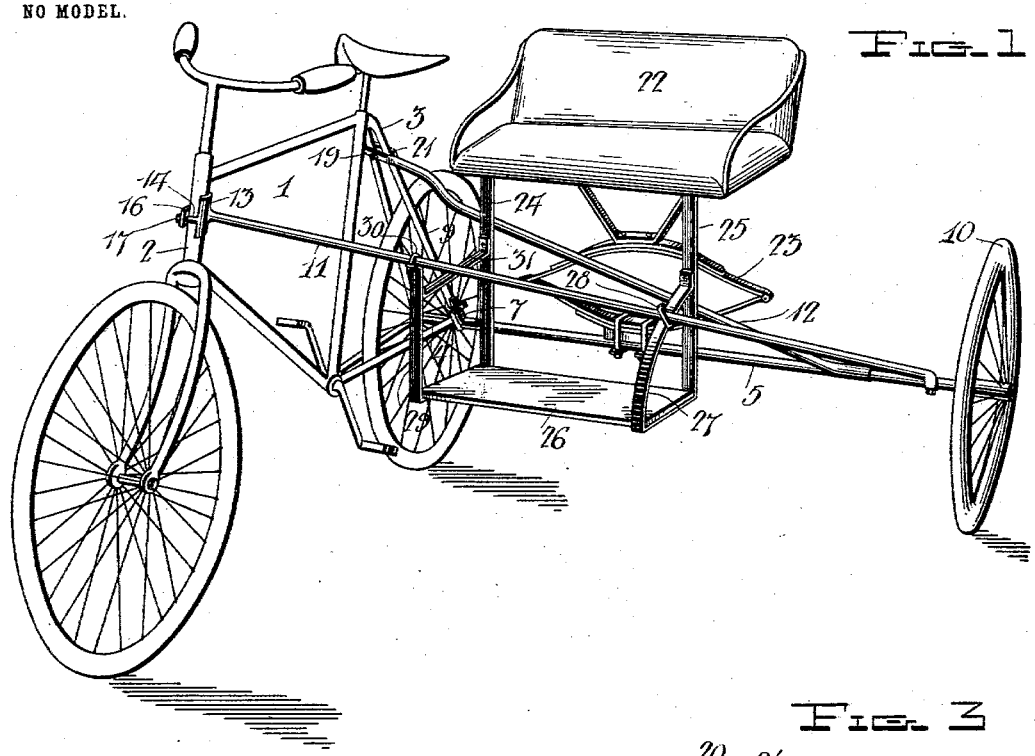
Figure 2:
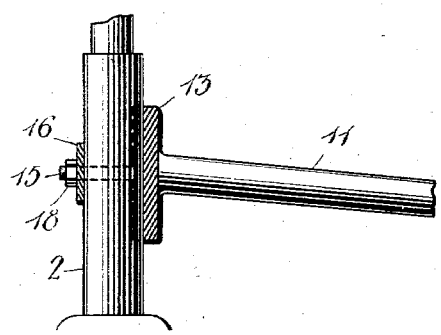
Figure 3:
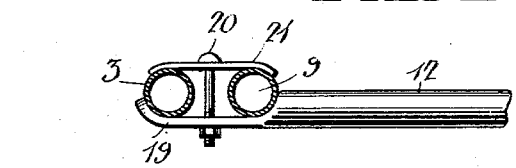
Figure 4:
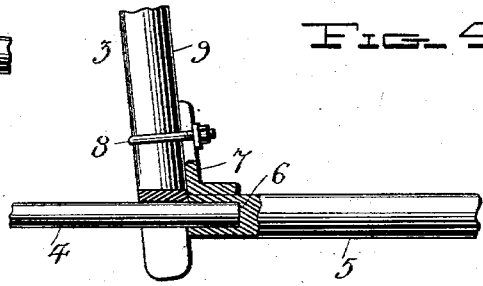

Figure 1 is a perspective view from the front, and Figs. 2, 3, and 4 detached detail views of the respectively front and upper and lower rear clamps by means of which the members of the extension-frame are secured to the bicycle-frame.

Like numerals are used to designate like parts in the several views.

Considering the drawings, numeral 1 marks the frame of a bicycle, of which numeral 2 designates the head, 3 the rear fork, and 4 the connecting bolt or axis of the rear hub.

The horizontal member of my invention consists of an axle-rod 5, having a hole 6 drilled in one extremity (see Fig. 4) to receive the projecting end of connecting-bolt 4, already mentioned. This extremity of axle-rod 5 has an angle-piece 7 brazed or otherwise firmly fixed upon it and extending for several inches at right angles to the axle-rod. By means of a suitable yoke-clamp 8, embracing the angle-piece 7 and the adjacent leg 9 of the rear fork 3, the end of the axle-rod is rigidly secured to the bicycle at that point, and it constitutes a continuation laterally with respect to the bicycle-frame of the connecting bolt or axis of the rear hub, as shown. The remaining end of the axle-rod 5 possesses a suitably-journaled wheel 10, and the rod may be made of any convenient length and the wheel of any selected pattern equal in diameter to the rear bicycle-wheel.

The inclined members or braces of my invention are two in number, one leading to the head of the bicycle and marked 11 and the other to the rear fork and marked 12. Both have junctions with rod-axle 5 near wheel 10. These junctions may be permanently welded or effected by clamping devices, the condition desired being that the inclined members shall have their outer ends most strongly attached to the rod-axle. The two inclined members 11 and 12 may be tubular or solid, and the rod-axle may also be so constructed. I do not confine myself to either rods or tubes solely.

At the head 2 of the bicycle-frame the forward inclined member 11 is provided (see Fig. 2) with a head-rest 13 and a prong-clip, the legs of which are referred to by numbers 14 and 15. Head 2 engages the rest, and the legs of the prong-clip straddle the head and are connected by the tie 16, which is clamped against the head by nuts 17 and 18 engaging the threaded ends of the legs of the prong-clip. It is believed to be within the scope of my invention to vary the construction and form of any of the clamping devices herein shown and described. Minor changes in detail are called for in different machines.

Fig. 3 illustrates one form of clamp for securing the inner end of the rear inclined member 12 to rear fork 3 of the bicycle-frame. The end of the member is flattened and has a terminal bent finger 19. A clamping-bolt 20 passes through this flattened end and through a short bar 21, and between this short bar and the flat portion of the member 12 the upper tubes of the rear fork are clamped by means of the bolt 20.

A seat 22 of any chosen form is supported upon the rod-axle 5 by a carriage-spring 23 and rests directly upon the ends of a V-shaped standard formed of flat bar metal. Two pieces of similar bar metal 24 and 25 depend from the front of the seat and uphold a footboard 26. A curving brace 27, extending backwardly from the forward edge of footboard 26 to the supporting-bar 25, to which it is secured, is also attached to the front inclined member 11 of the extension-frame by a clip 28. The remaining front corner of the footboard is supported from the inclined member 11 by the vertical bar 29, which has one end fixed to the edge of the footboard and its upper end connected with the inclined frame member 11 by clip 30. Vertical footboard suspension-bar 29 is connected toward the rear with the depending bar 24 by a riveted brace 31.

In practice I employ bicycles equipped with motors of any make or without other driving mechanism than the customary pedals. The invention permits the operator to propel the bicycle while occupying the saddle in the usual manner, or in the case of a motor-driven bicycle he may occupy the seat. The invention is particularly adapted, however, for the transportation of one or more passengers besides the operator, the former occupying the seat and the latter the bicycle-saddle.

I am aware that bicycles have been provided with extension-frames adapted to transport loads, especially for use on railway-tracks, and I do not claim that feature broadly.

What I claim, and desire to secure by Letters Patent, is—

1. In a seat-supporting bicycle extension-frame, the combination of the axle-rod 5, means for securing one end of said rod to the bicycle-frame whereby the said rod becomes a direct continuation of the rear axle of the bicycle, a wheel 10 revoluble on the outer end of said axle-rod, a seat-spring attached to the said axle-rod, a seat supported by the said spring, a rear inclined brace 12, a front inclined brace, each of said inclined braces having one extremity secured to the bicycle and the other end attached to the said axle-rod between said wheel 10 and the said seat-spring, a footboard, and footboard-supports attached to the said seat and to the said front inclined brace, substantially as described.

2. In a seat-supporting bicycle extension-frame, the combination of the axle-rod 5 having an orifice in one end to engage the rear axle of the bicycle, an angle-piece secured to said end and detachable means for clamping the said angle-piece to the bicycle-frame whereby the said axle-rod becomes a direct continuation of the rear axle of the bicycle, a wheel 10 revoluble on the outer end of the said axle-rod, a seat-spring attached to said axle-rod, a seat supported by said spring, a rear inclined brace 12, a front inclined brace, each of said inclined braces having an outer extremity secured to the said axle-rod between the said wheel 10 and the said seat-spring, the said front inclined brace having its inner end provided with the head-rest 13 and a prong-clip device adapted to secure the said head-rest to the head of the bicycle, clamping devices constructed and arranged to secure the inner end of the said rear inclined brace 12 to the rear of the bicycle, a footboard, and footboard-supports attached to the said seat and to the said front inclined brace, as shown and described.

In testimony whereof I affix my signature in presence of two witnesses.

GEORGE SAMUEL AKERS.

Witnesses:
JOHN F. MCCORMICK,
WILL D. MENEFEE.